May 18, 1965  J. P. I. JONSSON  3,184,032
ARRANGEMENT IN PATERNOSTER ELEVATORS
Filed June 26, 1962  4 Sheets-Sheet 1

INVENTOR
JOHN PETTER INGEMAR JONSSON
BY
*Linton and Linton*
ATTORNEYS

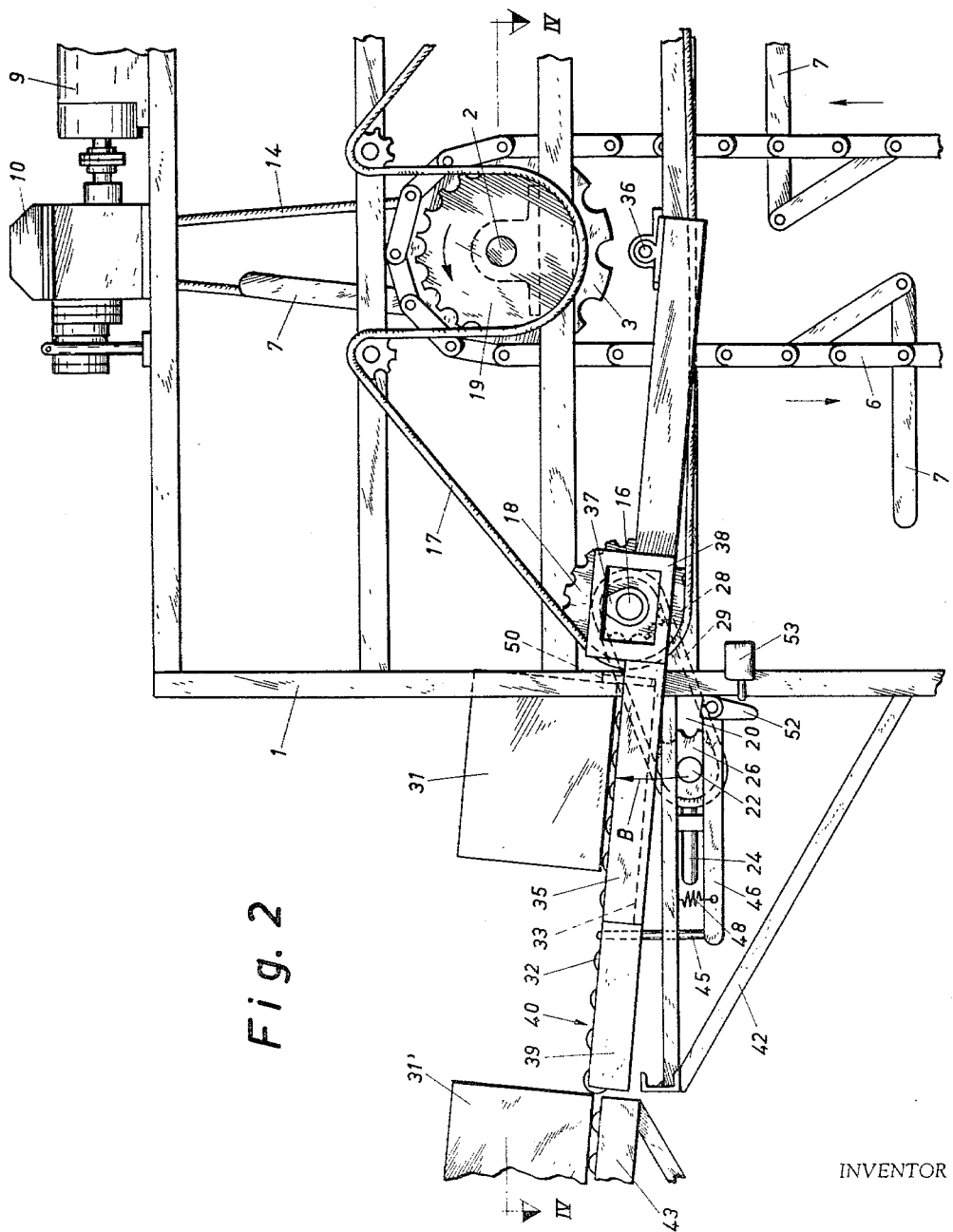

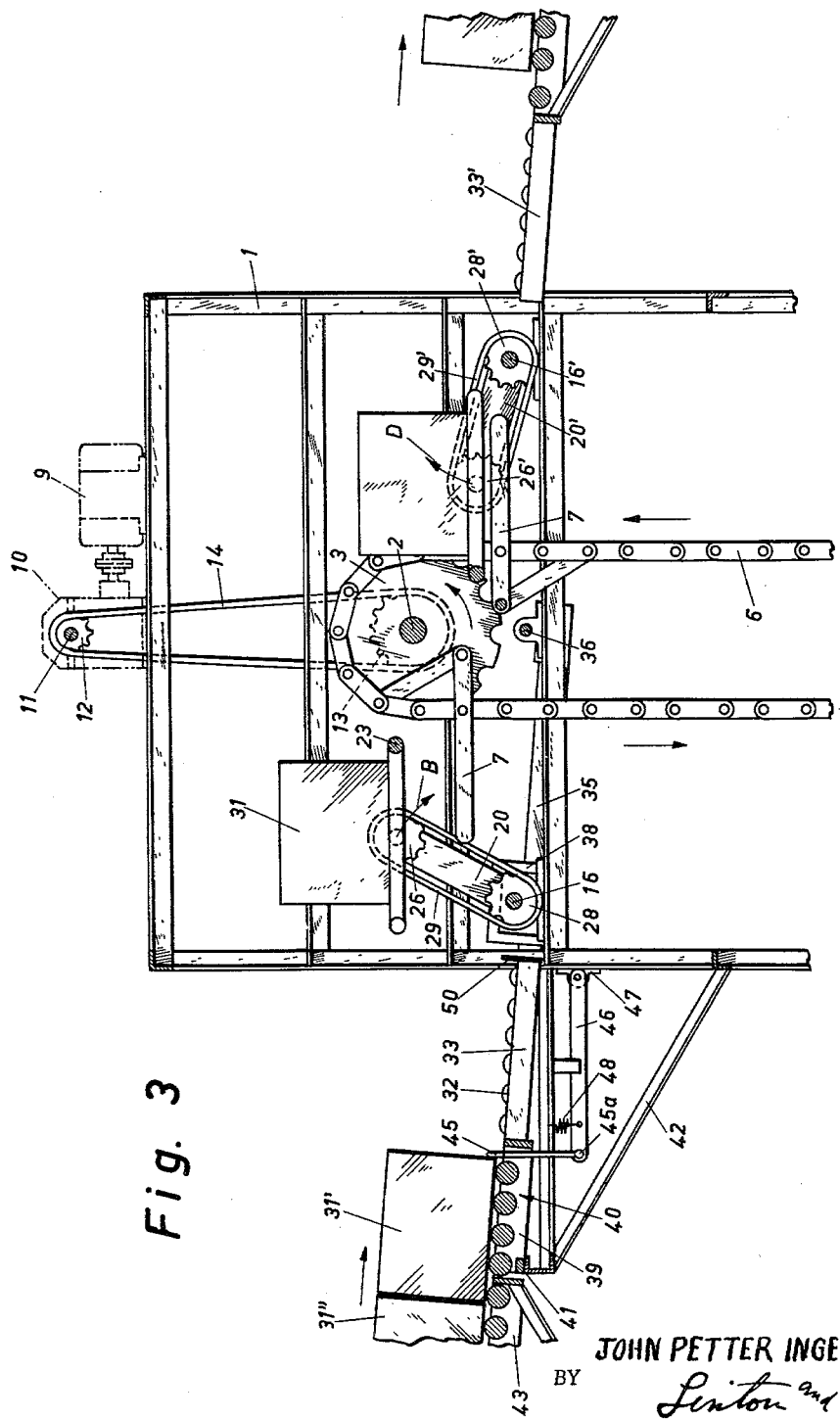

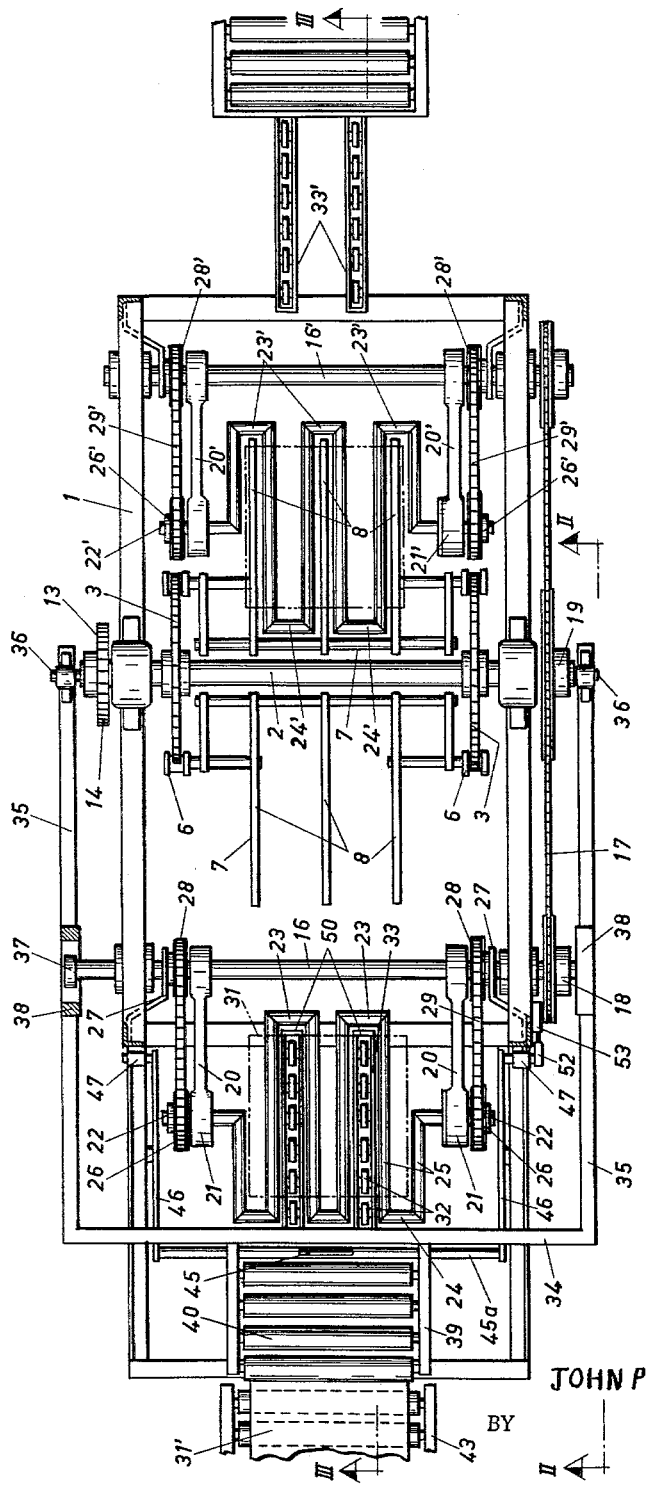

United States Patent Office 3,184,032
Patented May 18, 1965

3,184,032
ARRANGEMENT IN PATERNOSTER ELEVATORS
John Petter Ingemar Jonsson, Gothenburg, Sweden, assignor to Lecab Rullbanor Aktiebolag, Harryda, Sweden
Filed June 26, 1962, Ser. No. 205,439
2 Claims. (Cl. 198—27)

The present invention relates to paternoster elevators for goods conveyance and of the kind in which an endless conveyor or elevator band carries a plurality of projecting, forked goods carrying members, and a plurality of conveyors disposed at different levels adjacent to the elevator band are arranged for loading the goods on, and unloading goods from, the carrier members of the elevator.

The invention more particularly relates to paternoster elevators of the kind referred to of the type in which at least one of said conveyors comprises a horizontally disposed goods transferring member adapted to revolve about a horizontal axis while maintaining its horizontal orientation and having its path of movement in part coinciding with the path of movement of the carrier members carried by the elevator band, and also having its movement synchronised with that of the elevator band and so chosen that, during the passage of any carrier of the elevator band, the goods transferring member will carry out a movement unidirectional with that of said carrier and at a higher velocity than that of the carrier, whereby, for an upward movement of a carrier, the goods carried by the latter are taken over by the goods transferring member, and, for a downward movement of a carrier, any goods lying on the goods transferring member will be taken over by the carrier, there being further provided, for loading the goods to be conveyed onto the goods transferring member and for unloading from the latter goods taken over by the same from a carrier member, respectively, a plurality of roller tracks or rails inclined towards and away from the elevator band, respectively.

The invention has for its object to provide an elevator of the kind referred to which is structurally simple, efficient in operation and convenient to handle.

The invention is mainly characterized in that each goods transferring member comprises a plurality of deep, interconnected loops opening in relatively opposite directions and so disposed that, when the goods carrier is moving in one sense, the loops opening in one direction will pass between and/or on either sides of said roller tracks or rails projecting into the path of movement of the goods transferring member, while the loops opening in the opposite direction will pass between and/or on either sides of the tines of the carrier member being at that time in the path of movement of the goods transferring member.

In the case where a conveying roller way is provided for advancing the goods to the roller tracks or rails, then, according to a preferred embodiment of the invention, the roller tracks or rails may be carried by a yoke or the like pivoted on trunnions disposed in the vicinity of the elevator band, said yoke also carrying a plurality of rollers disposed between the roller tracks or rails and the lower end of the conveying roller way and serving for transferring the goods from the conveying roller way to the roller tracks or rails, means being provided for raising and lowering said yoke in timed relation to the orbital movement of the goods transferring member, and the yoke is adapted in its raised position to arrest the lowermost one of a plurality of items of goods to be conveyed by the elevator and being disposed in a row along the conveying roller way, and, in its lowered position, to allow said lowermost item to advance over said rollers onto said roller tracks or rails.

The yoke carrying the roller tracks or rails, to advantage, may be actuated by an eccentric or the like which is secured to the shaft carrying the goods transferring member and is adapted to impart to said yoke an upward and downward oscillatory movement in timed relation to the movement of the goods transferring member.

The goods transferring member may be rotatably mounted between the free ends of two spaced parallel arms projecting radially from a rotatable horizontal shaft synchronised with the elevator band, in which case a chain sprocket or gear wheel connected to the goods transferring member and coaxial with its bearing axis is operatively connected, through a chain or gear transmission, to a stationary chain sprocket or gear wheel coaxial with the shaft carrying said arms and being equal in diameter with the chain sprocket or gear wheel connected to the goods transferring member.

One embodiment of the invention is illustrated by way of example in the accompanying drawings, in which:

FIGURE 2 is an enlarged side-elevational view as seen in the direction of arrows II—II in FIGURE 4 and illustrating a portion of the top section of the elevator including a goods transferring device for automatically depositing goods onto the load carriers of the descending run of the elevator band;

FIGURE 3 is a vertical section through the top portion of the elevator as taken along line III—III in FIGURE 4 and showing the goods transferring device of FIGURE 2 in a different position of operation, as well as showing a goods transferring device serving to remove the goods from the load carriers of the ascending run of the elevator band;

FIGURE 4 is a horizontal cross-sectional view through the elevator substantially along line IV—IV in FIGURE 2.

Figure 1:
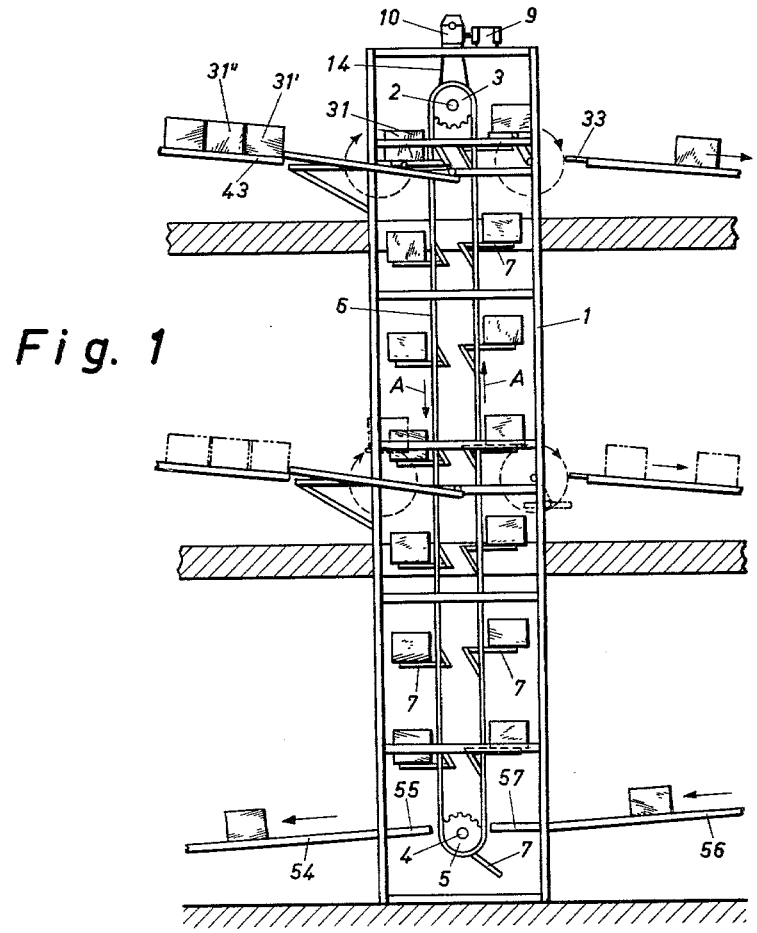
FIGURE 1 is a diagrammatic side-elevational view of an elevator incorporating arrangements according to the invention.
Figure 5:
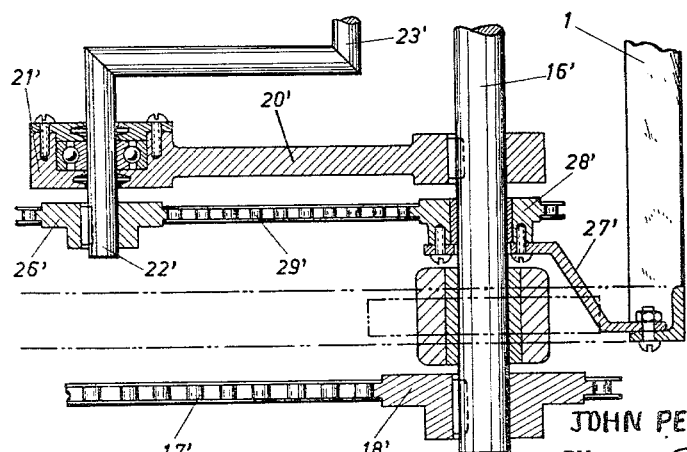
FIGURE 5, on a still larger scale, shows a horizontal cross section through certain portions of a goods transferring device.

Referring to the drawings, numeral 1 designates the stationary framework of the elevator. Mounted in the top portion of this frame is a shaft 2 carrying two chain sprockets 3 axially spaced from each other, and in the bottom portion a shaft 4 carrying two similarly spaced sprockets 5; trained around these pairs of sprockets 3 and 5, respectively, are two endless chains 6 carrying a plurality of regularly interspaced load-carrying members 7 serving to carry the freight or goods to be conveyed by the paternoster elevator. As shown most clearly in FIGURE 4, each load carrier is in the form of a fork having three tines 8 which are parallel to each other and disposed in a common plane so as to project horizontally from the two vertically extending runs of the pair of chains 6. The endless conveyor or elevator band constituted by the chains 6 is driven in the sense indicated by arrows A in FIGURE 1 by an electrical motor 9 mounted on top of the frame 1, through the intermediary of a gear transmission 10, a sprocket 12 keyed to the output shaft of this transmission, and a chain 14 trained over this sprocket and a sprocket 13 keyed to shaft 2.

For automatically depositing the goods on the carriers 7 of the descending run of the elevator band at desired stations, the latter are provided with goods transferring devices of a construction which will be described in detail hereinafter. Spaced in front of the top end portion of the descending run of the elevator band there is rotatably mounted in the frame 1 a horizontal shaft 16 which is parallel to the shafts 2, 4 and is adapted to be driven in the sense indicated by arrows B through a chain 17 which is trained around a sprocket 18 fixed to shaft 16 and a sprocket 19 fixed to shaft 2, the speed ratio being so chosen as to cause the shaft 16 to rotate one complete revolution while the elevator band is advanced a distance corresponding to the relative spacing of its carrier members 7. Projecting radially from shaft 16 are two spaced parallel arms 20 secured to said shaft. Each arm 20 at its free outer end carries a bearing 21, and mounted in these coaxially aligned bearings at its opposite end portions 22 is a goods transferring member composed of a plurality of deep interconnected loops 23, 24 opening alternately in opposite directions and having spaced parallel legs 25 disposed in a common plane. Secured to each end or trunnion portion 22 is a sprocket 26, and trained over the latter and a stationary sprocket 28 of the same size as sprocket 26 and loosely surrounding shaft 16 and carried by an arm 27 secured to the frame 1 is an endless chain 29, whereby, as the shaft 16 rotates, the goods transferring member 23, 24 will revolve in an orbital path about shaft 16 while being maintained in its horizontal orientation. That portion of the path of movement of the transferring member 23, 24 which is disposed adjacent to the elevator band coincides with the path of movement of the carriers 7, and the rotary motion of shaft 16 is synchronized with the movement of the elevator band in such a way that, as a descending carrier 7 passes the level of shaft 16, the goods transferring member 23, 24, moving at a velocity which is higher than that of the carrier, will pass with its loops between the tines 8 of the carrier, whereby the item 31 disposed on the goods transferring member will be taken over by the carrier to be conveyed downwards. Provided for depositing the goods onto the goods transferring members are a pair of spaced parallel rails 33 carrying rollers 32 and being inclined downwards and towards the shaft 16, said rails being embraced by the loops 23 of the goods transferring member during the upward movement of the transferring member (see FIG. 4), whereby any goods lying on the rollers 32 of the rails 33 will be taken over by the goods transferring member. The roller rails 33 are secured to the cross member 34 of a yoke, the legs 35 of this yoke at their free ends being pivotally mounted on trunnions 36, respectively, carried by the frame 1. Eccentrics 37 secured to the extreme ends, respectively, of shaft 16 engage bracket members 38 disposed on the yoke legs 35, respectively, so as, upon the shaft 16 being rotated, to impart to the yoke 34, 35 a slight oscillatory motion between the lowered position shown in FIGURE 3 and the slightly raised position shown in FIGURE 2. Further secured to the cross member 34 of the yoke 34, 35 are two spaced parallel arms 39 directed in the opposite sense relative to the roller rails 33 and carrying between them a plurality of rollers 40 forming a roller way and being interconnected at their free outer ends by a cross member 41 which in the lowered position of the yoke 34, 35 rests on a bracket 42 carried by the frame 1. In the raised position of the yoke 34, 35, as shown in FIGURE 2, the roller way 40 acts as a stop for the frontmost one of a plurality of items 31′, 31″ . . . which are disposed on an inclined roller way 43 having its lower end disposed in front of the roller way 40. In the lowered position of the yoke 34, 35, the frontmost one of the items disposed on roller way 43 is free to move onto the roller way 40 where it will be stopped by engaging a stop 45, which, in the lowered position of the yoke 34, 35, projects with its top end slightly above the plane of roller way 40. Said stop is secured to the cross member 45a of a yoke having its legs 46 at their free outer ends pivotally mounted in bearings, respectively, secured to the frame 1. The yoke 45a, 46 with the stop 45 is normally held in the position shown in the drawing by a tension spring 48 mounted between one yoke leg 46 and a portion of the bracket 42.

On the next-following elevation of yoke 34, 35, the item retained by the stop 45 will be released thereby allowing the same to advance onto the roller rails 33 and proceed downwards until being arrested by stop abutments 50 disposed at the lower ends of the latter, the item now occupying a position in which it will be gripped by the goods transferring member during its upward movement so as to be further conveyed in the manner previously described onto one of the load carriers 7 of the elevator band. If, due to some failure, an item of goods should be disposed above the stop 45 as the yoke or frame 34, 35 is lowered, then the yoke 45a, 46 carrying the stop will be depressed, whereby an arm 52 connected to the yoke will actuate a switch 53 interrupting the current supply to the drive motor 9 thus stopping the operation of the elevator. Near the bottom end of the descending run of the elevator band a roller way 54 is mounted, which is provided at its upper end with a pair of roller rails 55 onto which the carriers 7 deposit the items of goods lowered by the elevator.

The elevator is arranged also for elevating goods which, such as by means of a feeding device synchronized with the elevator band, is advanced from an inclined roller way 56 onto two roller rails 57 disposed at the bottom end of the ascending run of the elevator band in a manner to cause the goods lying on said rails to be taken over by the carrier members 7 of the elevator band. Disposed at the top end of the elevator band is an unloading device for removing the elevated goods from the carrier members and transferring the same onto a roller way. This unloading device, as shown in FIGURE 4, is constructed substantially identically with the loading device already described. Thus, this device comprises a shaft 16′ driven by the chain 17 and having two radially extending arms 20′ carrying between them the goods transferring member composed of relatively oppositely opening, deep loops 23′, 24′ and adapted, by the chains 29′ trained around the sprockets 26′ and 28′, to be maintained in a horizontally oriented position while being moved in an orbital path about shaft 16′ in the direction indicated by arrow D in FIGURE 3. During the upward movement of the goods transferring member the loops 24′ will pass between the tines 8 of the ascending member 7 thereby taking over the goods carried by the carrier member. During the downward movement of the goods transferring member, its loops 23′ will pass between and on either sides of two inclined roller rails 33′ which will thus take over the goods and transfer the same onto a roller way.

As indicated in FIGURE 1, the elevator plant may be equipped, at different levels, with a plurality of loading and unloading devices of the construction described hereinbefore and illustrated in FIGURES 2–4.

Incidentally, the invention is not restricted to the embodiment shown and described in this specification, the same being susceptible of various modifications without departing from the scope of the appended claims.

What I claim is:

1. A vertical conveyor comprising an upright frame, an endless conveyor extending longitudinally of said frame, driven means rotatably supported by said frame and connected to said conveyor for driving the same, at least one goods carrying member having a plurality of spaced apart tines extending laterally of said conveyor, at least one rotatably mounted shaft connected to said frame, means for rotating said shaft in coordination with said driven means, a plurality of spaced apart arms fixedly connected at one end to and extending radially from said shaft, a serpentine goods transferring member having a plurality of extended interconnected loops being positioned for having the tines of said goods carrying member pass therebetween during the movement of said conveyor and being rotatably mounted on the other end of said arms, means for maintaining said goods transferring member horizontal during its movement around said shaft, a U-shaped yoke pivotally connected to said upright frame and has said shaft rotatably mounted thereon, roller means extending laterally of and connected to said U-shaped yoke and positioned for extending between some of said loops of said goods transferring member when the same moves by said roller means and means for oscillating said U-shaped yoke to vary the angle thereof.

2. A vertical conveyor comprising an upright frame, an endless conveyor extending longitudinally of said frame, driven means rotatably supported by said frame and connected to said conveyor for driving the same, at least one goods carrying member fixedly connected to said conveyor, said goods carrying member having a plurality of spaced apart tines extending laterally of said conveyor, at least one rotatably mounted shaft connected to said frame, means for rotating said shaft in coordination with said driven means, a plurality of spaced apart arms fixedly connected at one end to and extending radially from said shaft, a serpentine goods transferring member having a plurality of extended interconnected loops positioned for having the tines of said goods carrying member pass therebetween during the movement of said conveyor and being rotatably mounted on the other ends of said arms, means for maintaining said goods transferring member horizontal during its movement around said shaft, a U-shaped yoke having a base and legs with said legs connected to said shaft, a pair of rails, rollers rotatably mounted on said rails, said rails being connected to and extending laterally of the base of said U-shaped yoke between the legs thereof, said rails being spaced apart and positioned for extending between some of the loops of said goods transferring member when the same moves thereby, means for oscillating said U-shaped yoke to vary the angle thereof and a resilient stop connected to said upright frame and positoned for extending between said rails when said U-shaped yoke is in its lowermost position tending to stop the passage of goods on said rollers.

References Cited by the Examiner

UNITED STATES PATENTS

| 1,959,799 | 5/34 | Potthoff | 198—25 |
| 2,749,687 | 6/56 | Imbs | 198—156 |

FOREIGN PATENTS

| 844,576 | 7/52 | Germany. |
| 942,498 | 5/56 | Germany. |
| 1,130,359 | 5/62 | Germany. |

SAMUEL F. COLEMAN, *Primary Examiner.*

WILLIAM B. LA BORDE, *Examiner.*